2,835,691

PROCESS FOR PRODUCING WAX PRODUCTS DERIVED FROM OXIDATION PRODUCTS OF PARAFFIN WAX

Erwin R. Sauter, Sasolburg, Orange Free State, Union of South Africa, assignor to South African Coal, Oil and Gas Corporation Limited, Sasolburg, Orange Free State, Union of South Africa No Drawing. Application June 6, 1955
Serial No. 513,593

11 Claims. (Cl. 260—452)

The present invention relates to a process for the production of improved wax products comprising organic carboxylic acids and/or wax esters and/or wax alcohols derived from products of the oxidation of paraffin wax and to the said improved products.

It has already been proposed to catalytically oxidize paraffin waxes, and especially those obtained by synthesis from gases containing carbon monoxide and hydrogen (hereinafter referred to for the sake of brevity as "Fischer-Tropsch" paraffin waxes) by means of air or other gas comprising free oxygen to products comprising wax carboxylic acids and esters. The higher the degree of oxidation, the softer do these products become and the more does their color change from white to yellow and even brown. These waxes comprise, according to their degree of oxidation, besides the wax carboxylic acids and esters aforesaid, aldehydes together with more or less or little or no original hydrocarbon material. Due to their complicated composition, they are useful only in a limited field of application and therefore cannot complete with the much purer and more uniform natural waxes such as carnauba wax, beeswax and the like.

It is an object of the present invention to process such oxidation products as intermediates for the production of improved wax products.

Other objects of the invention will become apparent from the following description.

In accordance with the present invention, it has been found essential in order to obtain wax products of the desired improved quality to employ as intermediates for the said processing, products containing carboxylic acids and esters obtained by the catalytic oxidation of paraffin waxes with air or other gases containing oxygen which have certain well defined properties.

A. *Production of intermediate product by catalytic oxidation of paraffin wax with air or other gas containing oxygen*

The said intermediate materials containing carboxylic acids and esters to be further processed in accordance with the invention to improved wax products are obtained by catalytic oxidation in a molten state of a paraffin wax having a melting point exceeding 75° C., usually above 80° C. and preferably above 85° C. with air or other gas containing free oxygen at an oxidizing temperature below 145° C. and for so short a time that the acid number of the product is substantial but does not exceed 30 and is preferably below 20.

The melting points referred to herein are based on determinations by the rotating thermometer method, but any other method of melting point determination may be employed provided the values obtained are corrected to the basis herein specified.

It is advantageous to so conduct the said oxidation as to produce intermediate products having acid numbers between 5 and 30 and saponification numbers between about 8 and 70, preferably acid numbers between 5 and 20 and saponification numbers between about 10 and 45. As will be explained in greater detail below, the degree to which the oxidation is carried out for optimal conditions depends on the nature and molecular weight of the paraffin waxes oxidized. It will be noted that in the intermediate products, in accordance with the invention, even with low degrees of oxidation, the saponification number is usually twice as great as their acid number. This indicates that an amount of carboxylic acid approximately equal to that present as free acid is combined to esters with alcohols of higher molecular weight. The formation of oxy-acids which occurs on over-oxidation should be suppressed as far as possible.

The melting point of the intermediate product is usually between about 95° and 75°.

The initial paraffin wax preferably has a melting point of about 86 to 105° C., advantageously of at least 100° C., and excellent intermediate products of higher molecular weight are also obtained by the oxidation of paraffin waxes having melting points of 105–117° C. The initial materials are preferably hard paraffin waxes having a means molecular weight above about 650, say between about 700 and 830 or between 830 and 1100 for products of higher molecular weight. They are preferably substantially free from constituents having a molecular weight below 500.

Particularly advantageous results are obtained when using as initial materials Fischer-Tropsch hard paraffin waxes of the aforesaid type.

Depending, more especially, on the catalysts employed, paraffin waxes of various general types are produced by the Fischer-Tropsch type synthesis.

Thus hard paraffin waxes are produced by a Fischer-Tropsch synthesis with cobalt or iron Fischer-Tropsch type catalysts.

Paraffin waxes of this origin, having melting points above 80° C. and preferably above 85° C. usually consist substantially of straight chain normal paraffins with a molecular weight of over 500. The percentage of branched chain hydrocarbons present varies between 10 and 20 percent, alpha-methyl branching being predominant. The olefin, aromatics, alcohol and aldehyde content of such waxes is usually very low, usually below 1–2 percent, at any rate in so far as the paraffin waxes produced with cobalt catalysts are concerned. With paraffin waxes containing olefins and possibly some oxygenates, which may be the case when they have been produced with iron catalysts, it is usually desirable to eliminate the olefins and the like by hydrogenation, sulfonation or the like. Such hydrogenated hard waxes even when derived from iron catalyst operation have a content of olefins, aldehydes, and alcohols well below 1 percent. Initial paraffin waxes containing some olefins, however, also give interesting intermediate products which, however, may lead to processed products with a higher oxidation number.

The molecular weight distribulation of such waxes varies considerably. All the hard wax collected from a Fischer-Tropsch synthesis reactor run over several months or from a plurality of synthesis reactors operated with catalysts of different ages, which is herein termed "total hard wax products" has the widest range. The average molecular weight of such wax is usually the higher, the higher the total wax yield from a given quantity of synthesis gas. Hard waxes from catalysts giving a yield below 25 percent hard wax with respect to total yield in $C_3+$ products in the Fischer-Tropsch synthesis usually do not contain wax constituents having a molecular weight higher than 60 carbon atoms per molecule or wax constituents melting above 108° C. in the total hard wax. Their average of carbon atoms in the molecule is between 40 and 50. On the other hand, total hard wax from a catalyst giving a yield higher than 25 percent of hard wax with respect to $C_3+$ products increases in average molecular weight considerably. Catalysts giving e. g. a hard wax yield near 40 percent with respect to all $C_3+$ products contain wax constituents with more than 100 carbon atoms in the molecule to the extent of 10–30 percent. If the reactor wax is taken from the very first period of the Fischer-Tropsch synthesis at medium pressure, this percentage of high molecular weight paraffin waxes is even larger and the molecular weights become even higher, so that constituents with more than 150 carbon atoms per molecule may be present in a substantial percentage.

From this it is obvious that the initial paraffin wax material and also the intermediate products obtained vary considerably within the limits herein specified.

(1a) It may be a total mix from a plant where, usually in a plurality of reactors, catalysts of different ages and production characteristics are employed. This total mix may have a melting point of about 90° C., an average molecular weight of about 650 and have on the average about 46 carbon atoms in the molecule. Solvent fractionation shows that the total mix has e. g. 10 to 15 percent of $C_{30}$–$C_{34}$ wax, 10 to 15 percent in the $C_{35}$–$C_{39}$ range, 70–55 percent wax content in the range $C_{40}$–$C_{50}$, and only 10 to 15 percent of waxes of a molecular weight higher than 800 ($C_{50}+$).

(1b) It may be a selected paraffin wax from initial periods of single reactors. This selected product contains much higher molecular paraffin wax than that referred to in 1a, e. g., with a maximum proportion at $C_{60}$, or $C_{80}$ or even higher, e. g. at $C_{100}$.

(1c) It may be fractionated paraffin wax as is obtained by fractional crystallisation or extraction. Such narrower range fractions may predominantly contain $C_{40}$, $C_{60}$, $C_{80}$, $C_{100}$ or $C_{150}$ waxes.

The degree to which the oxidation is carried out namely the acid numbers and saponification numbers desired for the intermediate product is dependent inter alia on the molecular weight of the hard paraffin wax selected as an initial material, as will be shown in the table below. The intermediate product usually contains over 50 percent of non-oxidized paraffin wax.

The catalytic oxidation of the paraffin wax with air or the like is usually carried out at temperatures of about 120°–140° C., say at about 130° C.

A thorough distribution of the oxidizing gas in the material being oxidized is a factor in favor of obtaining good results.

Fatty acid salts of manganese, cobalt, copper and the like, or oxides and salts, such as potassium permanganate, manganese dioxide, iron oxide or silver oxide are examples of the catalysts that may be employed for the oxidation to yield oxidized waxes. The catalysts are preferably dissolved or suspended in a finely divided condition in the molten paraffin wax undergoing oxidation, depending on their solubility.

The said oxidation is usually carried out at substantially atmospheric pressure, but may be carried out at any other suitable pressure, e. g. elevated pressure, if desired or required.

EXAMPLE 1.—(PRODUCTION OF INTERMEDIATE PRODUCT)

Hydrogenated molten hard wax having an acid number 0, saponification number 0, iodine number 2, and a melting point (rotating thermometer) 103° C. is filled into a thermostatically heated cylindrical glass vessel and 0.2% manganese stearate is added as catalyst. The air for oxidation of the wax is introduced into the molten wax with the aid of a fritted disc at the lower end of the vessel. The vessel should be approximately half filled with the paraffin wax. The temperature is regulated to about 130° C. and air flow is adjusted to about 120 normal litres of air per litre of wax. The oxidation is stopped after 6 to 8 hours when an intermediate product having an acid number of 15 and a saponification number of 32 has been produced.

B. *Processing of intermediate products to improve wax products*

In accordance with the present invention for the production of improved wax products, the intermediate products are subjected to a conversion bringing about a change in their state of oxidation.

This may be an oxidative treatment in which the esters contained in the intermediate product are hydrolyzed to wax acids and wax alcohols and the alcohols split off are oxidized to mainly the corresponding carboxylic wax acids, either at the time when they are produced by hydrolysis or in a subsequent operation.

Alternatively the said intermediate product is subjected to a reductive treatment to convert the esters and acids contained therein to alcohols.

C. *Oxidative conversion of intermediate products to wax acids*

The hydrolysis of the esters may be carried out in various ways, e. g. by treatment with hot water under pressure, by treatment with hot sulphuric acid, by a Twitchell type of reaction or the like.

The oxidation of the alcohols split off from the esters to carboxylic acids is carried out with any suitable oxidation chemicals, e. g. alkali bichromate in sulfuric acid, chromic acid or hydrogen peroxide. If desired the spent oxidation agent may be regenerated, e. g. electrolytically or in the case of chromium salts, by means of hydrogen peroxide.

TABLE

| Initial Hard Wax | Intermediate product | | Crude improved wax acid | |
|---|---|---|---|---|
| | Acid number | Saponification number | Acid number | Saponification number |
| A. About C35–C55 | 15–25 | 25–60 | 45–100 | 45–100 |
| B. {1. Max. about C60 | 10–15 | 17–35 | 30–50 | 30–50 |
| {2. Max. about C80 | 6–12 | 10–28 | 18–40 | 18–40 |
| C. Product rich in over C80 hydrocarbons | 2–10 | 4–25 | 8–40 | 8–40 |

The following example illustrates a de-esterifying hydrolysis and the almost simultaneous oxidation of the wax alcohols thus split off predominantly to the corresponding carboxylic wax acids.

EXAMPLE 2

The intermediate product is produced from a Fischer-Tropsch hard paraffin wax having a softening point ($r$ and $b$) of 102° C. and containing 2–3 percent of olefins by catalytic oxidation under conditions similar to those employed according to Example 1.

The initial paraffin wax is not previously hydrogenated, which constitutes the main difference from Example 1. The intermediate product thus produced has an acid number of 10 and a saponification value of 22. 100 parts of this intermediate product are filled into a round bottom flask and melted. 200 parts of hot 50 percent sulfuric acid are slowly added during about 15 minutes, and during a further 15 minutes 100 parts of hot 40 percent sodium bichromate solution are slowly added, keeping the liquid under constant stirring at near boiling temperature (about 105° C.), the entire reaction being completed in about 2 hours. After washing the crude wax acid thus produced with boiling water, sample analysis shows that the acid number is about 46 and the saponification number approximately 48 and the softening point 100.2° C. The increase in acid number is somewhat higher than in the case of hydrogenated wax which may be attributed to the presence of small amounts of olefins. It can be seen from this that the wax esters have been practically entirely converted to carboxylic wax acids.

D. *Refining of crude wax acids*

If desired or required, the carboxylic acids produced in accordance with the invention may be subjected to a refining treatment by any suitable method, e. g. for the removal of low molecular weight acids. For example, they may be subjected to solvent extraction, preferably with mixed solvents. Mixtures of an aromatic hydrocarbon, such as benzene, toluene and xylene, with an alcohol such as methanol, ethanol, propanol, isopropanol, butanol and the like in various ratios are suitable. Alternatively the carboxylic acids may be refined by vacuum distillation.

Examples 3 and 4 respectively illustrate the purification of the crude wax acids to remove low molecular weight acids by solvent extraction and vacuum distillation respectively.

EXAMPLE 3.—(REFINING BY MIXED SOLVENT EXTRACTION)

A sample of the crude wax acid produced in accordance with Example 2 is powdered and extracted in a Soxhlet apparatus with an ethanol-toluene mixture (68 percent+32 percent) for about 2 hours. A residue of about 50 percent is recovered from the thimble which on analysis gives an acid number of 32. It has a penetration of 30 units at 58° C. (the original has 55 units), hence it is considerably harder. The softening point ($r$ and $b$) is 102° C. (2° higher than the original). The extracted wax has an acid number of 55 and a softening point of 78° C. Penetration at 58° C. cannot be carried out as the wax is too soft.

EXAMPLE 4.—(REFINING BY VACUUM DISTILLATION)

The crude wax acid, washed with hot water and dried in a fatty acid still is subjected to vacuum distillation in order to remove the lower boiling acids and lower boiling hydrocarbons. This treatment yields similar results to the solvent extraction, but the product is not as white and more yellow in colour.

Depending on the raw material used and the further treatment and how much material is removed by solvent extraction, a large variety of raw wax acids can be obtained, so that in this way the varieties of further derivatives obtainable therefrom are manifold. Though the hard wax acids are the most desired product, it is obvious that the recovered lower molecular weight acids can be further treated according to the invention to convert them into useful products as well. In many cases, the hard wax acids thus obtained can be used directly for commercial purposes (textile auxiliaries) and as raw materials for further chemical reactions as mentioned below.

However, for obtaining still purer wax acids, unsaponifiable matter may be removed partly or substantially completely from the crude wax acids.

The removal of unsaponifiable matter can be achieved in several ways; e. g., by neutralization of the acid with alkali and solvent extraction of wax from the crude soap.

It is a special feature of the invention that this purification of raw wax acids is much easier than that of paraffin wax oxidation products.

The amount of lower molecular weight acid which has to be removed by extraction or the like in order to obtain the higher molecular weight fatty acids and unreacted wax is the greater, the higher the degree of oxidation of the intermediate product. When the crude acids listed in the table are refined by solvent extraction, the refined acids remaining as residue are from Crude acid from wax A—$C_{30}$–$C_{40}$
Crude acid from wax B—$C_{40}$–$C_{60}$
Crude acid from wax C—$C_{60}+$

E. *Reduction of intermediate product to alcohols*

To this end the free acid contained in the crude intermediate product is esterified and the crude esters thus obtained are then submitted to high pressure hydrogenation to convert them into crude and refined alcohols. Reduction with sodium metal can also be carried out instead of the said hydrogenation. (In special cases such esters are already very useful as improved waxes, e. g. when crude wax alcohols or similar alcohols or glycols (or other suitable poly-functional products) are used for the esterification.)

EXAMPLE 5.—(REDUCTION TO ALCOHOLS)

A paraffin wax oxidation intermediate product having an acid number 30 and a saponification number 50 is converted into an ester mixture with a saponification number of about 75 in the following way: For the esterification, a 2 litre flask with a reflux condenser, a second condenser discharging into a separating funnel as receiver and a return connection tube for recycling product from the separating funnel back to the flask is used. 200 g. of the said oxidation product are filled into a flask and 600 g. of n-butanol are added. Provision is also made to bubble a small stream of anhydrous hydrogen chloride through the liquid in the flask during the esterification. With the aid of an electric heater, the contents of the flask are refluxed for about 6 hours, then the cooling water from the reflux condenser is run off and the butanol-water azeotrope is first distilled over and later butanol. The water separating in the funnel is discarded and butanol is returned to the flask for some time and distilled over. The remaining crude ester with some butanol is now removed and submitted to high pressure hydrogenation. This is done in a small vertical electrically heated tube reactor of alloy steel, at about 200° C. and 200 atmospheres pressure by dropping the liquid ester from a pressurized charge vessel on top of the reactor into a current of hydrogen to flow therewith over a reduced nickel-kieselguhr catalyst of conventional type. The hydrogenated product is collected in a pressure receiver at the end of the vertical reactor and is removed via a needle valve. The crude hydrogenation product is then subjected to distillation in a vacuum still. Water and butanol are distilled off. Here again, it is important to continue the fractionation and to thus remove the lower boiling constituents. With this treatment, depending on the raw material used and the amount of lower boiling fractions taken off, a variety of crude alcohols is obtained which may vary even to a refined wax alcohol, which in itself is an improved product as against the crude oxidation product. They are valuable for a variety of commercial applications, e. g. in medical ointments and cosmetic products. In order to obtain "purified wax alcohols," these products are submitted to solvent extraction similar to that used for the crude wax acid. Also the wax alcohols can be sulfated and the hydrocarbons removed from the sulfate acid or from the neutralised product. The sulfate is later again split to recover purified wax alcohols. In this way, "crude wax alcohols" and "refined wax alcohols" are obtained.

F. *Crude wax acids, refined wax acids, crude wax alcohols, refined wax alcohols as starting materials for further chemical derivatives*

With the aforesaid materials obtained in accordance with the invention, it is now possible to prepare a large variety of chemical derivatives. Only a few important ones will be mentioned as typical examples, although it is an object of the invention to use these new raw materials on a very broad field.

(1) The esterification of crude or refined wax acids with crude or refined wax alcohols. These ester waxes, as has been explained previously, can be prepared with a large variety of properties, ranging from soft wax types to hard and brittle waxes, similar to natural waxes. Considerably improved products are thus obtained of great value for all industries where similar natural waxes have found application.

(2) The esterification of crude or refined wax acids with other higher alcohols, e. g. as shown in Example 5.

EXAMPLE 6.—(CETYL ESTER OF A HARD WAX ACID)

From the hard wax acid of Example 3, which contains about 50 percent of pure $C_{30}$–$C_{50}$ fatty acids, a cetyl ester is prepared in the following way: 100 parts of hard wax acid are melted in a round bottom vessel, about 1 part of zinc dust is added as a catalyst and then 10 parts of cetyl alcohol are added. The mixture is heated to about 200° C. for 3 hours, bubbling a $CO_2$ stream through to remove water. The wax is then decanted from the remaining zinc dust and filtered over an activated clay while still molten. Analysis of the cetyl ester wax thus obtained gives an acid number of 6, which is satisfactory for a commercial wax type. It is very hard, of white color and has a softening point (r and b) of 103° C.

The surface of the sample gives excellent gloss when rubbed with a cloth. The product can be used as a hard, gloss giving wax constituent in polish compositions.

A similar product is obtained using chloesterol as the alcohol constituent.

(3) When using lower molecular weight alcohols such as n-butanol for esterification with the hard wax acids, waxes are obtained with properties approaching those of beeswax.

(4) The esterification of crude and refined wax acids, with glycols and similar bi-functional or poly-functional compounds, e. g. glycerol or pentaerithrol. These esterifications are carried out in accordance with known practice. Valuable waxes are obtained, e. g. with glycols, of more than double the molecular weight of the acids. Monoesters of this type are valuable as emulsifiers.

(5) The formation of salts of crude wax acid or refined wax acids with alkali or alkaline earth metal oxides or hydroxides or amines and the like, e. g. with calcium hydroxide, harder products being thus obtained.

These salts prove of particular value in wax preparations, e. g. where emulsions have to be prepared and the like.

Total or partial neutralization of the aforesaid hard wax acids with alkali or alkaline earth metal oxides or hydroxides and other oxides or hydroxides, such as those of earth metals or of metals of the fifth, sixth, seventh or eighth group of the periodic system gives a series of interesting soaps and salts which prove useful as additives to soaps, lubricating oils and greases, and for cosmetic and pharmaceutical preparations.

(6) The wax alcohols may be esterified with other acid types or condensed with ethylene oxide (emulsifiers, textile auxiliaries) or reacted with ammonia to obtain amines.

What I claim is:

1. A process for the production of wax acid products, which comprises the catalytic oxidation in a molten state of a paraffin wax having a melting point exceeding 75° C. and a mean molecular weight exceeding 650 with a gas comprising free oxygen at an oxidizing temperature below 145° C. and for so short a time as to produce an intermediate oxidized wax product comprising carboxylic wax acids and wax esters, the said intermediate product having an acid number between 5 and 25 and a saponification number between 10 and 60, hydrolyzing the said wax esters to carboxylic wax acids and alcohols and oxidizing the said alcohols in the mixture by means of a chemical oxidizing agent to carboxylic wax acids.

2. A process as claimed in claim 1, in which the initial paraffin wax has a molecular weight between 700–1100.

3. A process as claimed in claim 1, in which the catalytic oxidation with a gas comprising free oxygen is carried out for so short a time as to produce an intermediate oxidized wax product comprising carboxylic wax acids and wax esters which product has an acid number between 5 and 20 and a saponification number between 10 and 45.

4. A process as claimed in claim 1, in which the initial paraffin wax is a hard paraffin wax with a melting point above 80° C. and a mean molecular weight exceeding 700 substantially consisting of straight chain normal paraffins produced by a Fischer-Tropsch type synthesis with iron group Fischer-Tropsch type catalysts.

5. A process as claimed in claim 1, in which a Fischer-Tropsch paraffin wax having a melting point above 85° C. and a mean molecular weight exceeding 700 is catalytically oxidized with air at a temperature of 120°–140° C. for so short a time to produce an intermediate oxidized wax product having an acid number between 5 and 20 and a saponification number between 10 and 45.

6. A process as claimed in claim 1, in which the wax alcohols split off from the wax esters of the intermediate product by hydrolysis are oxidized to wax acids with a bichromate in sulfuric acid.

7. A process as claimed in claim 1, in which the hydrolysis of the wax esters in the intermediate product is carried out with sulfuric acid.

8. A process as claimed in claim 1, in which the crude wax acids ultimately obtained are refined by vacuum distillation to remove low molecular weight acids.

9. A process for the production of a wax acid product, which comprises the catalytic oxidation in a molten state of a hard paraffin wax having 35 to 55 carbon atoms in the molecule, with a gas containing free oxygen at an oxidizing temperature below 145° C. to an intermediate product containing wax esters and acids and having an acid number of 15 to 25 and a saponification number of 25 to 60 and the intermediate product is hydrolyzed and oxidized by means of a chemical to yield an improved wax acid product having an acid number of 45–100 and a saponification number of the same order of magnitude.

10. A process for the production of beneficiated wax products, which comprises the catalytic oxidation in a molten state of a paraffin wax having a melting point exceeding 75° C. and a mean molecular weight exceeding 650 with a gas comprising free oxygen at an oxidizing temperature below 145° C. and for so short a time as to produce an intermediate oxidized wax product with an acid number not exceeding 30 and comprising carboxylic wax acids and wax esters, and subjecting the said intermediate product to hydrolysis and oxidation with a chemical to produce crude improved wax acid, refining the said wax acids to remove lower molecular weight acids therefrom and esterifying the refined acid with cetyl alcohol.

11. A process for the production of wax acids, which comprises the catalytic oxidation in a molten state of a Fischer-Tropsch paraffin wax having a melting point exceeding 85° C. and a mean molecular weight between 700 and 1100 with air at a temperature of 120°–140° C. and for so short a time as to produce an intermediate oxidized wax product with an acid number between 5 and 25 and a saponification number between 10 and 60, and subjecting the said intermediate product to hydrolysis and oxidation with chromic acid to produce a crude improved wax acid having an acid number and saponification number of between 45 and 100.

References Cited in the file of this patent

UNITED STATES PATENTS

| | | |
|---|---|---|
| 1,721,959 | James | July 23, 1929 |
| 1,828,356 | Burwell | Oct. 20, 1931 |
| 1,871,082 | Pungs | Aug. 9, 1932 |
| 1,909,945 | Gallsworthy | May 23, 1933 |
| 2,230,582 | Beller | Feb. 4, 1941 |
| 2,486,454 | Zellner | Nov. 1, 1949 |
| 2,592,964 | Smith | Apr. 15, 1952 |
| 2,660,601 | Dickinson | Nov. 24, 1953 |
| 2,681,356 | Wiese | June 15, 1954 |
| 2,682,553 | Kirk et al. | June 29, 1954 |
| 2,698,336 | Nelson | Dec. 28, 1954 |